United States Patent
Miller et al.

(10) Patent No.: US 8,533,453 B2
(45) Date of Patent: Sep. 10, 2013

(54) METHOD AND SYSTEM FOR CONFIGURING A SERVER AND DYNAMICALLY LOADING SSL INFORMATION

(75) Inventors: Joseph Miller, Chandler, AZ (US); Levente Batizy, Litchfield Park, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 1405 days.

(21) Appl. No.: 12/046,649

(22) Filed: Mar. 12, 2008

(65) Prior Publication Data
US 2009/0235067 A1 Sep. 17, 2009

(51) Int. Cl.
*H04L 29/06* (2006.01)

(52) U.S. Cl.
USPC ........... 713/151; 709/218; 709/219; 709/223; 709/236; 709/241; 718/105

(58) Field of Classification Search
None
See application file for complete search history.

(56) References Cited

U.S. PATENT DOCUMENTS

| | | | |
|---|---|---|---|
| 5,657,390 A | 8/1997 | Elgamal et al. | |
| 5,825,890 A | 10/1998 | Elgamal et al. | |
| 6,430,688 B1 | 8/2002 | Kohl et al. | |
| 6,438,594 B1 * | 8/2002 | Bowman-Amuah | 709/225 |
| 6,516,338 B1 | 2/2003 | Landsman et al. | |
| 6,643,694 B1 * | 11/2003 | Chernin | 709/223 |
| 6,968,571 B2 * | 11/2005 | Devine et al. | 726/11 |
| 6,970,939 B2 * | 11/2005 | Sim | 709/236 |
| 6,981,139 B2 | 12/2005 | Enokida | |
| 6,990,513 B2 * | 1/2006 | Belfiore et al. | 709/203 |
| 7,111,162 B1 * | 9/2006 | Bagepalli et al. | 713/151 |
| 7,149,892 B2 * | 12/2006 | Freed et al. | 713/151 |
| 7,155,723 B2 * | 12/2006 | Swildens et al. | 718/105 |
| 7,165,095 B2 * | 1/2007 | Sim | 709/217 |
| 7,194,543 B2 * | 3/2007 | Robertson et al. | 709/226 |
| 7,233,978 B2 * | 6/2007 | Overton et al. | 709/217 |
| 7,373,500 B2 * | 5/2008 | Ramelson et al. | 713/150 |
| 7,649,854 B2 * | 1/2010 | Piper | 370/265 |
| 7,757,074 B2 * | 7/2010 | Sundarrajan et al. | 713/151 |
| 2001/0049786 A1 | 12/2001 | Harrison et al. | |
| 2003/0126431 A1 | 7/2003 | Beattie et al. | |
| 2004/0049587 A1 | 3/2004 | Henaff et al. | |
| 2004/0210663 A1 * | 10/2004 | Phillips et al. | 709/230 |
| 2005/0015586 A1 | 1/2005 | Brickell | |
| 2005/0125319 A1 | 6/2005 | Johnson | |
| 2005/0172128 A1 | 8/2005 | Little et al. | |
| 2005/0246534 A1 | 11/2005 | Kirkup et al. | |

OTHER PUBLICATIONS

Mraz, Ron. Secure Blue: An Architecture for a Scalable, Reliable High Volume SSL Internet Server. Proceedings 17th Annual Computer Security Applications Conference. Pub. Date: 2001. Relevant pp. 391-398. Found on the World Wide Web at: http://ieeexplore.ieee.org/stamp/stamp.jsp?tp=&arnumber=991556.*

* cited by examiner

*Primary Examiner* — Nathan Flynn
*Assistant Examiner* — Jeremiah Avery
(74) *Attorney, Agent, or Firm* — Chris A. Watt (57) ABSTRACT

Systems and methods of the present invention provide for configuring a server and loading SSL information by dynamically loading SSL information into a template based on an implicit SSL-based configuration. A Proxy Server may be used to determine an IP address on which the incoming network request was received, implicitly configure a configuration file accordingly, determine if an SSL information is contained within a cache, on a disk or in a database for the IP address and dynamically load the SSL information into an implicit generic template.

20 Claims, 5 Drawing Sheets

METHOD AND SYSTEM FOR CONFIGURING A SERVER AND DYNAMICALLY LOADING SSL INFORMATION

FIELD OF THE INVENTION

The present invention generally relates to the field of computer networking and encrypted communications capability and, more specifically, systems and methods for improving the efficiency of load balancing and the scalability of server clusters by implicitly configuring and dynamically loading secure sockets layer (SSL) information, thus avoiding the need to restart servers containing SSL information.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet, one of the best known networks, is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Web sites allow individuals and businesses to share their information with a large number of Internet users. Many products and services are offered for sale on the Internet, thus elevating the Internet to an essential tool of commerce. Web sites created by Internet businesses may be reached by millions of Internet-savvy customers, thereby allowing Internet businesses to offer their products and services to a very large pool of potential customers.

To assist Internet businesses in operating their Web sites, many companies offer hosting services for Web sites. These hosting companies typically provide the hardware, software and electronic communication means necessary to connect multiple Internet businesses' Web sites to the Internet. A single hosting company may literally host thousands of Web sites. A computer or server may host one or more Web sites.

An unfortunate consequence of the Internet's growth is the accompanying growth of fraud on the Internet. The Internet was originally designed with the academic and scientific communities in mind, and it was assumed that users of the network would be working in a non-adversarial, cooperative manner. The TCP/IP protocols underlying the Internet were not originally designed to provide secure data transmission. Increasing use and transmittal of confidential information over the Internet demanded improved security measures for communications over the Internet.

A common method for Internet businesses to protect their Customers from fraud is to obtain an SSL (or its more recent counterpart Transport Layer Security (TLS)) Certificate for their Web sites. SSL includes a protocol for transmitting private documents via the Internet by using a private key to encrypt data transferred over an SSL connection. An SSL certificate on a Web site lets Customers know that the owner of the Web site has been verified by a trusted third party (Certificate Authority or CA) and that confidential communications with the Web site are encrypted.

The certificate (such as an X.509 certificate) typically includes an identification of the server (such as its hostname), the server's public key, and a digital signature provided by the well known CA. The digital signature is used by a client receiving the certificate from a server to authenticate the identity of the server before initiating a secured session. In particular, the application on the client initiating the secured communication session, such as an Internet browser, is typically installed with a public key ring including public keys for various well known CAs that allow the client to verify server certificates issued by these CAs. Common conventional browsers, such as NETSCAPE NAVIGATOR and INTERNET EXPLORER, support the SSL protocol, and many Web sites use the protocol to obtain confidential user information from their Customers. By convention, Uniform Resource Locators (URLs) that require an SSL connection start with "https:" instead of "http:".

SUMMARY OF THE INVENTION

The present invention provides methods and systems for configuring a server and loading SSL information by dynamically loading SSL information into a template based on an implicit SSL-based configuration.

In an example embodiment, a connection for one or more incoming network requests on a port which recognizes encryption-related protocols may be accepted. Once the connection is accepted, load balancing may then be performed on the incoming network traffic requests. For encryption-related requests, the load balancing step may comprise sticky-session load balancing. After load balancing is performed, a server may be implicitly configured to respond to the incoming network requests without explicitly defining a plurality of SSL information for one or more web sites and without requiring a restart of the server. The implicitly configured server may then forward the incoming network traffic requests to one or more application servers.

The server configuring step above may further comprise determining an IP address upon which the incoming network traffic request was received. A further determination may then be made as to whether a plurality of SSL information is contained within a cache, on a disk or in a database for the IP address. If said SSL information is found, several additional steps may be performed. These steps may include creating a server configuration inferred from the IP address, creating a template inferred from the server configuration, dynamically loading the SSL information into the template and establishing an SSL connection based on the dynamically loaded SSL information.

The network traffic forwarding step above may further comprise performing a plurality of application services for one or more web sites by the application servers, and finding and loading a plurality of appropriate content based on a plurality of Host: header information.

An exemplary system for configuring a server and loading SSL information may comprise a Proxy Server, wherein the Proxy Server further comprises server Resources, a Server Log, a Switch, a Load Balancer, SSL Termination Means, a Dynamic Configuration File, a Generic Template, a plurality of Dynamic SSL Information or any combination thereof.

The Proxy Server may also be communicatively coupled to a Network, one or more server Clusters, one or more Application Servers, or any combination thereof within a server network cluster environment.

The above features and advantages of the present invention will be better understood from the following detailed description taken in conjunction with the accompanying drawings.

DETAILED DESCRIPTION

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Overview

One major issue for hosting companies is how to handle the potentially large number of visitors to their hosted sites. As hosting companies expand their customer base, thousands of their customers may require SSL information. For purposes of this disclosure, SSL may be defined to include TLS or any other protocol now known or later developed in the art for transmitting private documents via the Internet by using a private key to encrypt data transferred over an SSL or any equivalent connection. SSL information may likewise be defined to include private keys, certificates, key/certificate pairs or any other equivalent components or combinations of components now known or later developed in the art for encrypting or verifying encrypted information or sources of encrypted information.

Current server network cluster environments must explicitly define each site's related SSL information, which means the server's configuration file must be changed each time a customer's hosting information is added, updated, or removed. In other words, the SSL information for each customer must be physically added to or removed from the server's configuration file. Just as with any other server configuration parameter, in order for such SSL information to be recognized by the server, a server restart is required so that the new configuration may take effect. By way of analogy, and not limitation, the required restart is much like a required restart of a standard desktop PC when new software is added.

As the configuration file grows with each of these additions or removals, the time required for the configuration file to load during the restart of the server increases. As the customer base of a hosting environment expands into the thousands, the configuration file can reach hundreds of megabytes and the restart of the server can require several minutes each time any new SSL information is added or removed.

In short, all existing server network cluster environments share a common problem with efficiency. Current web servers in existing server network cluster environments require an explicit definition of each site and related SSL information. In addition, the provisioning process for constantly adding, updating, and/or removing the explicit definitions from existing web servers' configuration files is unnecessarily complex, and after SSL negotiation, the web servers accomplish little more than sending the request on to application servers which perform application services for all sites.

Unlike standard Hypertext Transfer Protocol (HTTP) web sites which all fit some kind of generic template, the web servers used in typical server network cluster environments do not allow any sort of templating for SSL-based sites. In fact, no server used in current server network cluster environments allows for templating. Instead, all currently used web servers explicitly define each site's IP address and SSL information for each IP that will handle SSL. A restart of the server and reloading of the configuration file is required each time a new customer is added or removed. In all cases, this severely limits the ability to scale to support hundreds or thousands of SSL sites efficiently.

Additionally, startup times may be excessively high (APACHE WEB SERVER, for example, can take 3-5 minutes to "startup" on current server hardware when 5000+ SSL certificates are defined). This limits the ability to efficiently handle a large multi-tenant application or hosting service with SSL certificates.

By contrast, the current invention provides a way of simplifying the provisioning process for the addition or removal of SSL information from the server's configuration file, through implicit configuration and dynamic loading of SSL information, which improves the overall efficiency of the server cluster.

The current invention, rather than preloading SSL information at startup, dynamically loads SSL information on an as-needed basis. The current invention "infers" the configuration required to create a kind of templating for SSL-based sites. The inferred configuration and templating of SSL-based sites allows for the dynamic loading of the SSL information based on the IP that the request was received on.

A Method for Server Configuration and SSL Information Loading

Several different methods may be used to implicitly configure a server and dynamically load SSL information. In a sample embodiment illustrated in FIG. 1, connections from a network on port *:80 (hereafter "port 80") or port :443 (hereafter "port 443") may be anticipated (Step 100). When an incoming network request is made, a new connection may be accepted (Step 101). A determination may then be made as to whether the connection is on port 443 (Step 102), indicating it contains encrypted information. If the connection is not on port 443 (Step 102), load balancing may be performed (Step 103), the HTTP request may be read (Step 104) and the request may be sent to one or more backend servers (Step 105). If the connection is on port 443 (Step 102), sticky session load balancing may be performed (Step 106). The server may then be implicitly configured without any requirement of explicit SSL definition or a restart of the server (Step 107). After configuring the server, the HTTP request may be read (Step 104) and the request may be sent to one or more backend servers (Step 105).

Figure 1:
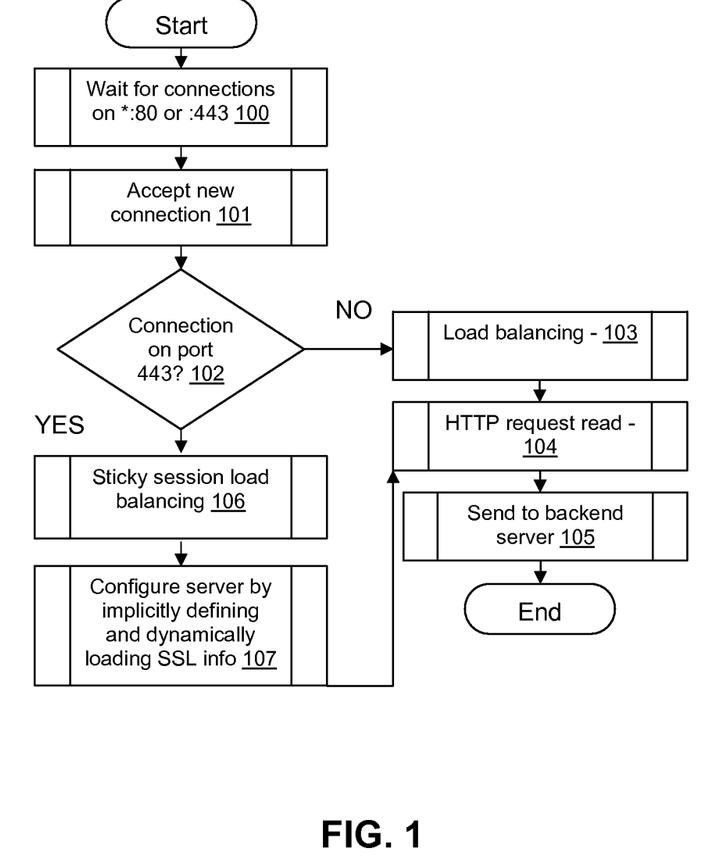
FIG. 1 is a flow diagram illustrating a possible embodiment of a method for configuring a server and loading SSL information.

As seen in FIG. 1, network connections on port 80 or port 443 may be anticipated (Step 100). The example embodiments herein place no limitation on network configuration or connectivity. Thus, as non-limiting examples, the network could comprise the Internet, an intranet, an extranet, a local area network, a wide area network, a wired network, a wireless network, a telephone network, or any combination thereof.

The distinction between port 80 and port 443 is that port 80 uses an HTTP protocol which may be used for a request/response protocol between clients and servers. The client may make an HTTP request, and the server may respond with the HTML pages and images requested by the client.

By contrast, port 443 uses HTTPS protocol. Strictly speaking, HTTPS is not a separate protocol. It is syntactically identical to the http:// scheme normally used for accessing resources using HTTP. Using an https: URL indicates that HTTP is to be used, but with a different default Transmission Control Protocol (TCP) port (443) and an additional encryption/authentication layer between the HTTP and TCP. HTTPS refers to the combination of a normal HTTP interaction over an encrypted SSL or TLS connection.

In the context of the current invention, when a network request is made, a new connection may be accepted (Step 101), and a determination may then be made as to whether the connection should use HTTPS protocol on port 443 (Step 102) or HTTP protocol on port 80.

This determination of whether a connection is found on port 443 (Step 102) further determines whether typical or sticky session load balancing (Steps 103 and 106 respectively) will be performed on the request. Load balancing may comprise a technique of using one or more load balancers to spread work between a plurality of servers, computers, processes, hard disks or other resources in order to get optimal resource utilization. Load balancing may also decrease computing time and/or increase the capacity of a set or group of tightly coupled servers that work together—known as a "server cluster" or "server farm"—beyond that of a single server.

All workload may come through one or more load-balancing front ends. A virtual server (also referred to as vserver or VIP) may be bound to a number of physical services running on the physical servers in a set of servers. These physical services may contain the physical server's IP address and port. A client may send a request to the virtual server, which in turn may select a physical server in the set of servers and may direct the request to the selected physical server.

Load balancing (Step 103) may further comprise monitoring services in a set of servers. In case of failure of a service, load balancing may continue to be performed across the remaining services that are functioning properly.

Sticky session load balancing (Step 106), by comparison, may further comprise distributing user requests across a set of servers in such a way that requests from a given user may be consistently sent to the same server. The association of a session, or consistent connection of a client, with a backend server is referred to as a "sticky session". Sticky session load balancing (Step 106) may send each user request to the specified primary server, any local changes to session state may then be copied to a backup server, and all updates to session state may then be made from one of these backend servers. Sticky session load balancing (Step 106) may improve the efficiency of persistent sessions in a configuration of servers in a server cluster.

If it is determined that the connection from the network request is on port 80 rather than port 443 (Step 102), HTTP protocol will be used. This means that no sticky session load balancing is necessary. Typical load balancing may be performed (step 103), and the HTTP request may then be read (Step 104) and the request may be sent to one or more back-end servers (Step 105).

The determination of whether a connection is found on port 80 or port 443 (Step 102) also determines whether a proxy server will need to be configured to handle SSL information. As with load balancing, if it is determined that the connection is on port 80, the HTTP request may be read (Step 104) without the need to configure the proxy server to handle SSL information. The request will then be sent to one or more backend servers (Step 105).

If the connection is on port 443 (Step 102), the proxy server used to handle the HTTP request may be implicitly configured without explicitly defining SSL information or restarting the server (Step 107). A proxy server may comprise a server, a computer system or an application program which services the requests of its clients by forwarding requests to other servers in a server cluster or server farm (Step 105). A proxy server may provide a resource (web page, file, streaming information, etc.) to a client by connecting to a specified server and requesting the service on behalf of the client. All traffic and connections coming from a network and with a destination of and addressed to one of the servers may be routed through a proxy server, which may either deal with the request itself or pass the request wholly or partially to a main server (Step 105).

In a preferred embodiment of the current invention, a reverse proxy may be used. A reverse proxy is a proxy server which acts as a proxy for in-bound traffic to several servers hidden behind a single IP address (e.g. a cluster of web servers all serving content for the same domain) as opposed to a 'forward proxy' which acts as a proxy for out-bound traffic. The reverse proxy may also distribute the load to several back end servers, each server serving its own application area (Step 105). The reverse proxy may be installed in the neighborhood of the cluster or server farm and used in conjunction with load balancing (Step 103), described above and incorporated herein by reference.

Servers within a server cluster may be configured by means of a configuration file, contained on, and used to configure, the server. A configuration file may comprise a file containing text and/or other information regarding various parameters which may be used to determine the configuration of the server or cluster. One non-limiting example of parameters changed within the configuration file may include changes to SSL information. The current invention may configure the server with the appropriate SSL information (Step 107) prior to the HTTP request being read (Step 104) and the request being sent to the backend servers (Step 105). This configuration is accomplished by implicitly configuring the server without explicitly defining the relevant SSL information and without requiring a restart of the server (Step 107), as outlined below.

Figure 2:
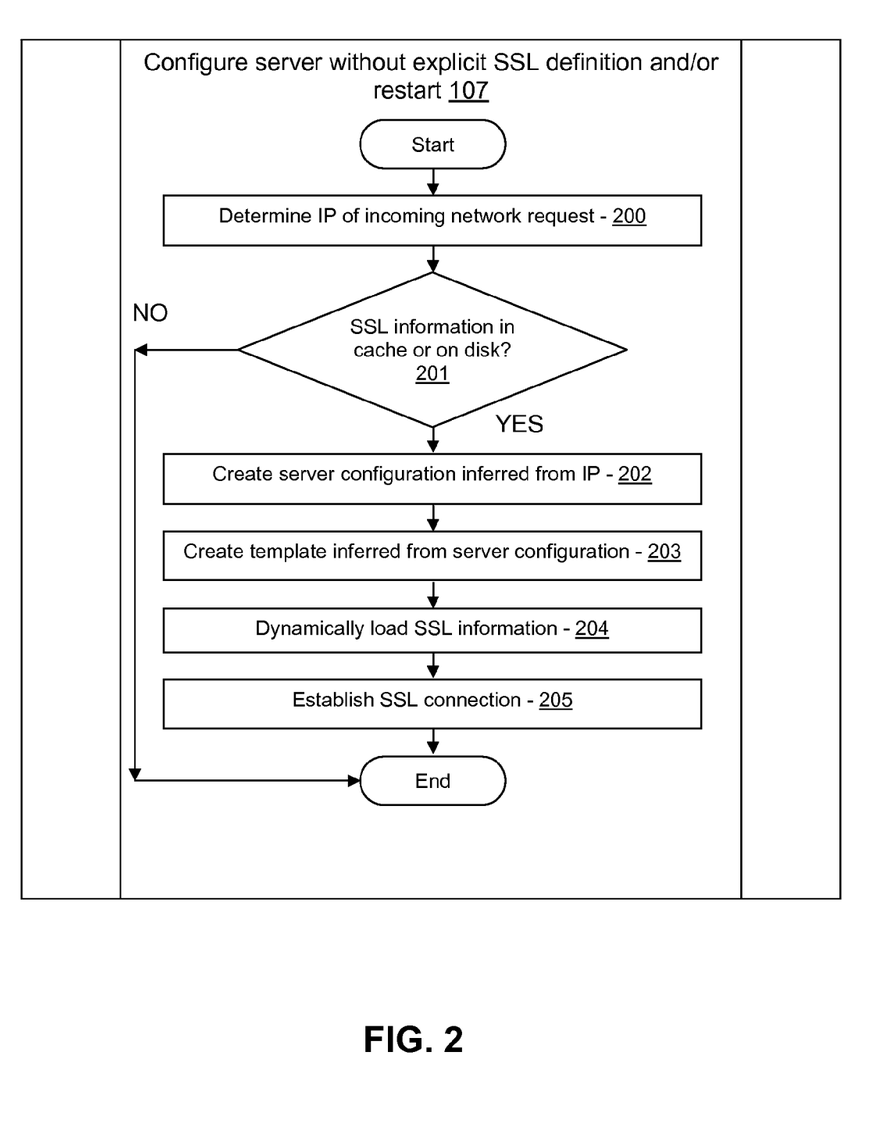
FIG. 2 is a flow diagram illustrating a possible embodiment of a method for configuring a server and loading SSL information.

Referring now to FIG. 2, additional steps may be included within the step wherein the server is implicitly configured to respond to the incoming network requests without explicitly defining SSL information for one or more websites and/or without requiring a restart of the server (Step 107). A determination may be made regarding which IP address a network request was received on (Step 200). A determination may then be made regarding whether a plurality of SSL information is contained within a cache, on a disk, or in a database for the IP address requested (Step 201). If no SSL information is in a cache, on a disk, or in a database for this IP (Step 201), the process may terminate. If SSL information is in a cache, on a disk, or in a database for this IP (Step 201), a server configuration may be created, inferred from the IP address (Step 202). A template may then be created which is inferred from the server configuration (Step 203). With the server configuration and template implicitly created, the SSL information may be dynamically loaded (Step 204) and an SSL connection may be established based on the dynamically loaded SSL information (Step 205).

By way of analogy and not limitation, this infrastructure may be compared to dynamic web pages in standard HTTP which use templates to personalize a user's information. A bank customer, for example, may log into a bank's website to learn more about his or her account. The website will use that user's login information to identify the user and access information specific to that user, such as checking or savings account information. If the user selects a link requesting checking account information, the bank's website will load a generic template for a checking account page, and then the user's specific information will be used to fill checking account information into that page, thus dynamically creating a personalized experience for the user.

In a similar way, the current invention uses the incoming IP address (Step 200) to create an inferred server configuration (Step 202) personalized to the incoming IP address. This inferred configuration can be used to create an inferred template (Step 203) for the SSL information identified by the IP address. The SSL information can then be dynamically loaded (Step 204) into the inferred template, similar to how the user's checking account information is dynamically loaded into the checking account web page template. By dynamically loading the SSL information into an implicit configuration and template rather than explicitly defining the SSL information in a server configuration file, a restart of the server is avoided and the entire network sever cluster environment becomes more efficient.

As shown in FIG. 2, and as explained above, load balancers and reverse proxies may have access to and may be aware of the IP address associated with in-bound traffic directed to back end servers. This IP address may be one of two common standards for IP addresses, as well as any other standard currently used or utilized in the future. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

By determining the IP address on which the incoming traffic is received (Step 200), a determination may be made regarding whether a plurality of SSL information is contained within a cache, on a disk or in a database for this particular IP address (Step 201). IP and SSL information may be stored on disk, in cache, in a database, or by any other storage device for storing data. As non-limiting examples, the disk, cache or other storage device may comprise a magnetic storage device, disk drive, FLASH or RAM memory, local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage located on at least one server, a computer, a client, another server, or any other storage device.

If no such SSL information exists in cache, on disk or in a database for the IP address (Step 201), the process terminates, as the steps following Step 201 would have no purpose if such SSL information is not found within a cache or on disk for this IP address.

However, if such SSL information exists in cache, on disk or in a database for this IP address (Step 201), the process continues by using the IP address to create a server configuration inferred from the incoming IP address (Step 202). Just as the login information identified the bank customer in the non-limiting example above, the incoming IP address may be used to identify the SSL information related to that IP address, and the server may retrieve the appropriate information from a disk or cache to dynamically modify the configuration file according to the inferred parameters appropriate to that IP address (Step 202).

The server configuration inferred from the IP address (Step 202) may then be used to create a template inferred from the server configuration (Step 203). The template may include software methodologies used to produce an infrastructure into which the SSL information contained in cache or on disk may be dynamically loaded (Step 204), just as the checking account page in the non-limiting example above acted as the infrastructure into which the bank customer's personal checking information could be loaded.

Such a template may make use of a template engine, which may be hardware or software acting as the primary processing element of the system. The template may further make use of a content resource, which may include any of the various kinds of stored information and input from data streams or network data, enumerated elsewhere in this application. The template and content resources may then be processed and combined by the template engine to, in a sense, "mass-produce" dynamic configurations, so that as each IP address is recognized, a dynamic configuration of SSL information may be created in the configuration file for that IP address.

Figure 3:
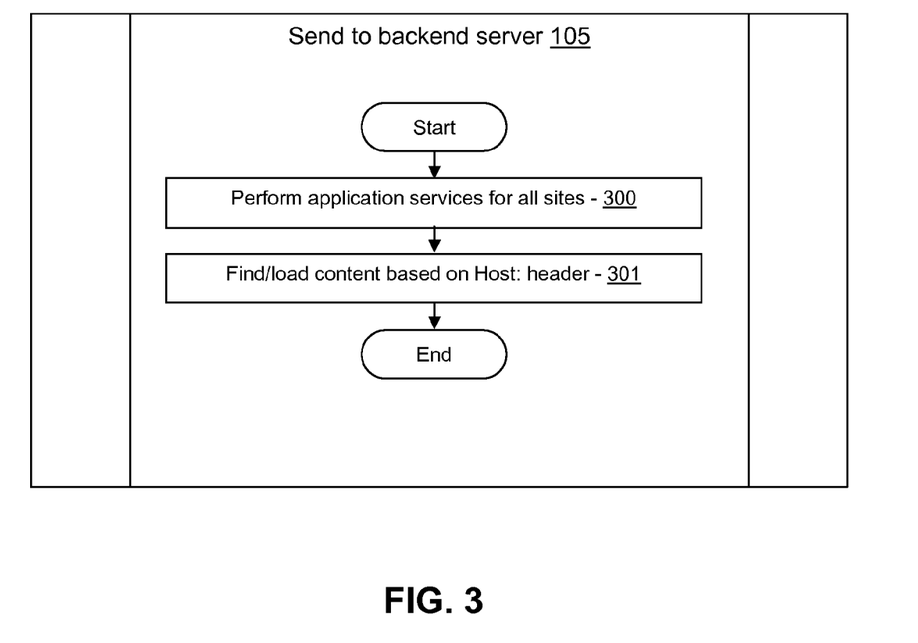
FIG. 3 is a flow diagram illustrating a possible embodiment of a method for configuring a server and loading SSL information.

Referring now to FIG. 3, additional steps may be included within the step wherein the incoming network request is forwarded to one or more application servers (Step 105). The application servers may perform a plurality of application services for one or more websites (Step 300). After these application services are performed, the application servers may use the Host: header information to find and load a plurality of appropriate content for the websites (Step 301).

The application servers may perform the one or more application services (Step 300), including, but not limited to, responding with the appropriate HTML pages and content. The application servers may perform these services through use of a software engine that may deliver applications to client computers or devices typically through the internet and using the HTTP protocol. The application servers may be run using their own internal HTTP server, or alternatively, the application servers may be run in cooperation with other web servers.

The application servers may also be able to find and load the appropriate "store front" content based on the Host: http header field (defined in RFC 2616) information (Step 301), so that the application servers have no explicit configuration and never need to be restarted.

A System for Implicit and Dynamic SSL Termination

Figure 4:
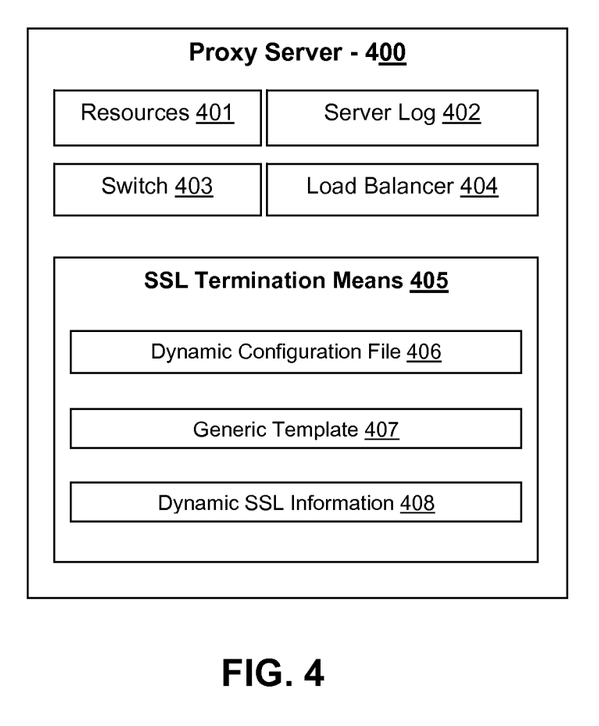
FIG. 4 illustrates a possible embodiment of a system for configuring a server and loading SSL information.

As shown in FIG. 4, an embodiment of the current invention may comprise one or more Proxy Servers 400.

The Proxy Server 400 may comprise a server, a computer system, hardware, software or an application program on a machine readable medium designed to service the requests of its clients by forwarding requests to other servers in a server cluster or server farm. All traffic and connections coming from a network and with a destination of, and addressed to, one of the application servers in a server cluster (described in more detail below) may be routed through the Proxy Server 400, which may either deal with the request itself or pass the request wholly or partially to a main server.

Examples of Proxy Servers 400 may include Apache HTTP Server, Microsoft Internet Security and Acceleration Server, Sun Microsystems Java System Web Proxy Server and SafeSquid. This list is not exhaustive of all proxy servers. Any other proxy servers currently known or developed in the future may also be used.

The Proxy Server 400 may further comprise server Resources 401 such as web pages, files, streaming information, etc., to be provided to a client. Such server Resources 401 may also be found on a specified application server in the server network cluster environment and requested on behalf of the client.

The Proxy Server 400 may also include a Server Log 402, which may further comprise one or more log files automatically created and maintained by the Proxy Server 400 of activity, including web requests, performed by the Proxy Server 400. Non-limiting examples of information contained in such a Server Log 402 may include date, time, and page requested, client IP address, HTTP code, bytes served, user agent, referrer or any other information from the headers of a client's browser information as they arrive from the client browser to the backend application servers. Additional information may also be added to this header, including, but not limited to information about the SSL client certificate and information regarding the real client IP address. Back end servers may use this extra information in order to create their Log 402 files with the real client address. Logs 402 may also log requests and reply to the system Log 402.

The Switch 403 may comprise a computer system, hardware, software or an application program on a machine readable medium communicatively coupled to the Proxy Server 400 and designed to connect network elements, inspect data packets as they are received, determine the source of the destination device of that packet and forward it appropriately. By delivering each message only to the connected device it was intended for, the Switch 403 may conserve network bandwidth and may generally improve performance. The Switch 403 may also be content aware, or in other words, send requests to different servers or network elements based on the URL being requested.

Non-limiting examples of Switches 403 may include an ETHERNET hub, LAN switching, a 10/100 switch, a gigabit switch, an optical switch, a network bridge, a router, any combination of the above, or any other system or method of improved efficiency in connecting network elements currently known or later developed in the art.

The Load Balancer 404 working in conjunction with the Switch 403 may comprise a server, a computer system, hardware, software or an application program on a machine readable medium communicatively coupled to the Proxy Server 400 and designed to distribute the requests from one or more client browsers among several back-end application servers, while retaining session information.

Examples of Load Balancers 404 may include Cisco's CONTENT SERVICES SWITCH (CSS), PLATFORM LSF HPC, Sun GRID ENGINE, MOAB CLUSTER SUITE, MAUI CLUSTER SCHEDULER, LINUX VIRTUAL SERVER or any combination thereof. These examples are non-limiting. Any other configuration of spreading work between servers in a server cluster in order to increase the capacity of a server cluster beyond that of a single server which is currently known or developed in the future may also be used.

The SSL Termination Means 405 may comprise a computer system, hardware, software or an application program on a machine readable medium communicatively coupled to the Proxy Server 400 and designed to recognize SSL connections and to allow traffic transitions between encrypted and unencrypted forms. Such an SSL Termination Means 405 may handle both SSL offloading and SSL termination. As shown in FIG. 4, the SSL Termination Means 405 may further comprise a Dynamic Configuration File 406, a Generic Template 407 and Dynamic SSL Information 408.

The Dynamic Configuration File 406 may comprise a modifiable configuration file, as described elsewhere in this application and incorporated herein by reference. The parameters of the Dynamic Configuration File 406 may be constructed and/or modified in such a way as to not require an explicitly configured pre-loading architecture. The Dynamic Configuration File may be designed to allow for the implicit definition of each site's IP address.

The Generic Template 407 may be similar to, but not limited by, those used for standard HTTP web sites. Thus, the Generic Template 407 may allow the Proxy Server 400 to be able to handle large numbers of SSL information without requiring reconfiguration or a restart of the Proxy Server 400. The Generic Template 407 may accomplish this through use of a template engine, described elsewhere in this application and incorporated herein by reference.

The Generic Template 407 may further comprise a content resource which contains the Dynamic SSL Information 408, described elsewhere in this application and incorporated herein by reference. The Dynamic Configuration File 406, the Generic Template 407 and the Dynamic SSL Information 408 may then be processed and combined by the template engine to, in a sense, "mass-produce" dynamic configurations, so that as each IP address is recognized, a configuration of Dynamic SSL information 408 may be created in the Dynamic Configuration File 406 and applied to the Generic Template 407 for that IP address.

Figure 5:
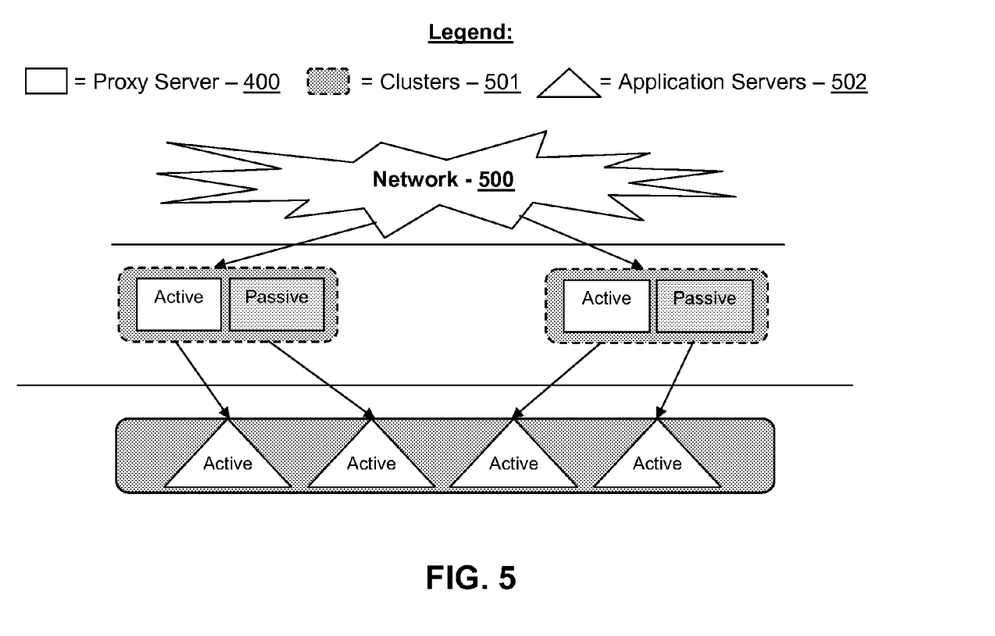
FIG. 5 illustrates a possible embodiment of a system for configuring a server and loading SSL information.

As shown in FIG. 5, the Proxy Server 400 may be communicatively coupled to, and bring greater efficiency to a server network cluster environment. The server network cluster environment may further comprise a Network 500, one or more server Clusters 501 and one or more Application Servers 502.

Network 500 may include, but is not limited to the Internet, the public switched telephone network, the global Telex network, computer networks (e.g., an intranet, an extranet, a local-area network, or a wide-area network), wired networks, and wireless networks.

The one or more server Clusters 501 may comprise a group of tightly coupled computers that work together so that in many respects they can be viewed as though they are a single computer. The components may be connected to each other through fast local area networks which may improve performance and/or availability over that provided by a single computer, while typically are much more cost effective than single computers of comparable speed or availability.

The server Clusters 501 may further comprise active or passive nodes within the server Clusters 501. In active/passive clustering, the cluster includes active nodes and passive nodes. The passive nodes are only used if an active node fails.

The one or more Application Servers 502 may comprise a software engine that delivers applications to client computers or devices typically through the Internet and using the http protocol. For purposes of this disclosure, Application Servers 502 may also include web servers generally, since most Application Servers 502 essentially are web servers, and web servers fit within the application layer of the OSI stack.

Such Application Servers may include but are not limited to Apache Tomcat, Java EE 5 application server, Java API for XML Web Services, JOnAS application server, Microsoft's . NET Framework, Appaserver, Base4 and Zope.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising: one or more server computers communicatively coupled to a network and running:
   A) a content request receiving module configured to:
      i) receive a request for a website content; and
      ii) search a header of said request for a header parameter indicating that said request requires transmission of one or more encrypted data and
   B) a server configuration module configured, responsive to a determination that said request requires transmission of said one or more encrypted data, to:
      i) extrapolate, from said header, an internet protocol address for one or more backend application server computers communicatively coupled to said network and hosting said website content;
      ii) search a database communicatively coupled to said network for one or more server configuration data, said one or more server configuration data:
         a) being stored in said database in association with said internet protocol address; and
         b) comprising one or more server configuration parameters for configuring said one or more server computers to request said one or more encrypted data via one or more secure network protocols; and
      iii) responsive to locating, in said database, said one or more server configuration data:
         a) generate a dynamic server configuration template for configuring said one or more server computers to request said one or more encrypted data via said one or more secure network protocols;
         b) load said one or more server configuration parameters into said dynamic server configuration template; and
         c) forward said request to said internet protocol address for said one or more backend application server computers without requiring a restart of said one or more server computers.

2. The system of claim 1, wherein said one or more servers comprise any combination of:
   i) one or more proxy servers configured to service said request by:
      a) establishing a communication session between said one or more backend application servers and a client computer communicatively coupled to said network, said client computer comprising the source of said request; and
      b) responsive to a determination that said request requires transmission of said one or more encrypted data, route said incoming request through a port on said one or more server computers configured to anticipate, recognize and accept a network connection using said one or more secure network protocols; and
   ii) one or more reverse proxy servers configured to route a plurality of in-bound traffic to said one or more backend application server computers responsive to said one or more application server computers being hidden behind a single internet protocol address serving a plurality of content for a common network domain.

3. The system of claim 2, wherein said header comprises one or more details about one or more components required to initiate and establish a secured communication session, said one or more components comprising any combination of:
   i) an internet browser on said client computer configured to initiate said secured communication session;
   ii) a client security certificate on said client computer, said client security certificate configured to verify a source of said one or more encrypted data via a security certificate signed by a trusted third party and hosted on said one or more backend application servers hosting said website content;
   iii) a public key ring comprising one or more public keys to verify said website content and said one or more encrypted data from one or more websites via said one or more secure network protocols.

4. The system of claim 3, wherein said header comprises a client internet protocol address associated with a plurality of in-bound network traffic directed from said client computer to said one or more backend application servers, wherein said client internet protocol address is identified by any combination of:
   i) said one or more proxy servers;
   ii) said one or more reverse proxy servers;
   iii) one or more load balancers; and
   iv) one or more network switches.

5. The system of claim 3 wherein:
   i) responsive to receiving said request and establishing said communication session, said one or more server computers are configured to load balance said request by distributing, between said one or more backend application servers, a load created by said request; and
   ii) responsive to receiving said request and establishing said secured communication session, said one or more server computers are configured to sticky session load balance the request by distributing, between said one or more backend application servers, a load created by said request, wherein said request from said client computer is consistently sent to the same server.

6. The system of claim 4 wherein said dynamic server configuration template comprises:
   i) a template for a dynamic server configuration file capable of dynamic modification according to one or more inferred server configuration parameters appropriate to:
      a) said client internet protocol address; and
      b) said website hosted on said one or more backend application servers found at said internet protocol address; and
   ii) one or more modifiable configuration parameters configured to receive and modify, within said dynamic server configuration template according to said one or more inferred server configuration parameters, said one or more server configuration parameters.

7. The system of claim 6 wherein said dynamic server configuration template is generated by a template engine comprising:
   i) any combination of hardware and one or more software methodologies used to produce an infrastructure comprising a generic template for said one or more inferred server configuration parameters into which said one or more server configuration parameters in said database may be dynamically loaded; and
   ii) said one or more software methodologies configured to dynamically combine said generic template with said one or more server configuration parameters from said database into said dynamic server configuration template, wherein said dynamic server configuration template determines said server configuration for said one or more server computers.

8. The system of claim 6 wherein said dynamic server configuration template does not require:
   i) an explicit definition of said one or more server configuration parameters;
   ii) preloading said one or more server configuration parameters into a server configuration file prior to starting said one or more server computers; or iii) restarting said one or more server computers and reloading said server configuration file for each of said one or more servers in response to adding, modifying or removing said one or more server configuration parameters.

9. The system of claim 2 wherein said one or more server computers are further configured to:
   i) forward, on behalf of said client computer and via a request/response protocol, one or more network requests with a destination of, and addressed to, said one or more backend application servers;
   ii) locate and transmit said website content to said client computer, said website content comprising any combination of one or more web pages, one or more images and a plurality of text for a website, said website content being transmitted via any combination of:
      a) one or more hypertext transfer protocols;
      b) one or more request/response protocols;
      c) one or more internet protocols; and
      d) one or more transmission control protocols.

10. The system of claim 9 wherein, responsive to a determination that said request requires said website content to transmit said one or more encrypted data, said one or more server computers are further configured to:
    i) transmit a response comprising said one or more encrypted data via the Internet, said one or more encrypted data being encrypted according to a private key configured to encrypt data or confidential communications and transferred via one or more secure network protocols, said one or more secure network protocols comprising said one or more hypertext transfer protocols on a transmission control protocol port supporting an encryption layer or an authentication layer between said one or more hypertext transfer protocols and said one or more transmission control protocols;
    ii) recognize a network connection using said one or more secure network protocols; and
    iii) facilitate one or more traffic transitions between one or more encrypted forms and one or more unencrypted forms to accomplish offloading and termination of said one or more encrypted data, via any combination of said one or more secure network protocols and said one or more internet protocols.

11. A method, comprising:
    A) receiving, by one or more server computers communicatively coupled to a network, a request for a website content;
    B) searching, by said one or more server computers, a header of said request for a header parameter indicating that said request requires transmission of one or more encrypted data
    C) responsive to a determination that said request requires transmission of said one or more encrypted data:
       i) extrapolating from said header, by said one or more server computers, an internet protocol address for one or more backend application server computers communicatively coupled to said network and hosting said website content;
       ii) searching, by said one or more server computers, a database communicatively coupled to said network for one or more server configuration data, said one or more server configuration data:
          a) being stored in said database in association with said internet protocol address; and
          b) comprising one or more server configuration parameters for configuring said one or more server computers to request said one or more encrypted data via one or more secure network protocols; and
       iii) responsive to locating, in said database, said one or more server configuration data:
          a) generating, by said one or more server computers, a dynamic server configuration template for configuring said one or more server computers to request said one or more encrypted data via said one or more secure network protocols;
          b) loading, by said one or more server computers, said one or more server configuration parameters into said dynamic server configuration template; and
          c) forwarding, by said one or more server computers, said request to said internet protocol address for said one or more backend application server computers without requiring a restart of said one or more server computers.

12. The method of claim 11, wherein said one or more servers comprise any combination of:
    i) one or more proxy servers configured to service said request by:
       a) establishing a communication session between said one or more backend application servers and a client computer communicatively coupled to said network, said client computer comprising the source of said request; and
       b) responsive to a determination that said request requires transmission of said one or more encrypted data, route said incoming request through a port on said one or more server computers configured to anticipate, recognize and accept a network connection using said one or more secure network protocols; and
    ii) one or more reverse proxy servers configured to route a plurality of in-bound traffic to said one or more backend application server computers responsive to said one or more application server computers being hidden behind a single internet protocol address serving a plurality of content for a common network domain.

13. The method of claim 12, wherein said header comprises one or more details about one or more components required to initiate and establish a secured communication session, said one or more components comprising any combination of:

i) an internet browser on said client computer configured to initiate said secured communication session;
ii) a client security certificate on said client computer, said client security certificate configured to verify a source of said one or more encrypted data via a security certificate signed by a trusted third party and hosted on said one or more backend application servers hosting said website content;
iii) a public key ring comprising one or more public keys to verify said website content and said one or more encrypted data from one or more websites via said one or more secure network protocols.

14. The method of claim 13, wherein said header comprises a client internet protocol address associated with a plurality of in-bound network traffic directed from said client computer to said one or more backend application servers, wherein said client internet protocol address is identified by any combination of:
    i) said one or more proxy servers;
    ii) said one or more reverse proxy servers;
    iii) one or more load balancers; and
    iv) one or more network switches.

15. The method of claim 13 further comprising the steps of:
    i) responsive to receiving said request and establishing said communication session, load balancing, by said one or more server computers, said request by distributing a load created by said request between said one or more backend application servers; and
    ii) responsive to receiving said request and establishing said secured communication session, said one or more server computers are configured to sticky session load balance the request by distributing a load created by said request between said one or more backend application servers wherein said request from said client computer is consistently sent to the same server.

16. The method of claim 14 wherein said dynamic server configuration template comprises:
    i) a template for a dynamic server configuration file capable of dynamic modification according to one or more inferred server configuration parameters appropriate to:
        a) said client internet protocol address; and
        b) said website hosted on said one or more backend application servers found at said internet protocol address; and
    ii) one or more modifiable configuration parameters configured to receive and modify, within said dynamic server configuration template according to said one or more inferred server configuration parameters, said one or more server configuration parameters.

17. The method of claim 16 wherein said dynamic server configuration template is generated by a template engine comprising:
    i) any combination of hardware and one or more software methodologies used to produce an infrastructure comprising a generic template for said one or more inferred server configuration parameters into which said one or more server configuration parameters in said database may be dynamically loaded; and
    ii) said one or more software methodologies configured to dynamically combine said generic template with said one or more server configuration parameters from said database into said dynamic server configuration template, wherein said dynamic server configuration template determines said server configuration for said one or more server computers.

18. The method of claim 16 wherein said dynamic server configuration template does not require:
    i) an explicit definition of said one or more server configuration parameters;
    ii) preloading said one or more server configuration parameters into a server configuration file prior to starting said one or more server computers; or
    iii) restarting said one or more server computers and reloading said server configuration file for each of said one or more servers in response to adding, modifying or removing said one or more server configuration parameters.

19. The method of claim 12 further comprising the steps of:
    i) forwarding, by said one or more server computers, on behalf of said client computer and via a request/response protocol, one or more network requests with a destination of, and addressed to, said one or more backend application servers;
    ii) locating and transmitting, by said one or more server computers, said website content to said client computer, said website content comprising any combination of one or more web pages, one or more images and a plurality of text for a website, said website content being transmitted via any combination of:
        a) one or more hypertext transfer protocols;
        b) one or more request/response protocols;
        c) one or more internet protocols; and
        d) one or more transmission control protocols.

20. The method of claim 19 further comprising the steps of, responsive to a determination that said request requires said website content to transmit said one or more encrypted data:
    i) transmitting, by said one or more server computers, a response comprising said one or more encrypted data via the Internet, said one or more encrypted data being encrypted according to a private key configured to encrypt data or confidential communications and transferred via one or more secure network protocols, said one or more secure network protocols comprising said one or more hypertext transfer protocols on a transmission control protocol port supporting an encryption layer or an authentication layer between said one or more hypertext transfer protocols and said one or more transmission control protocols;
    ii) recognizing, by said one or more server computers, a network connection using said one or more secure network protocols; and
    iii) facilitating, by said one or more server computers, one or more traffic transitions between one or more encrypted forms and one or more unencrypted forms to accomplish offloading and termination of said one or more encrypted data, via any combination of said one or more securenetwork protocols and said one or more internet protocols.

* * * * *